Feb. 15, 1949.   J. RIEMER   2,461,569
PACKAGING APPARATUS
Filed Aug. 29, 1946   13 Sheets-Sheet 4

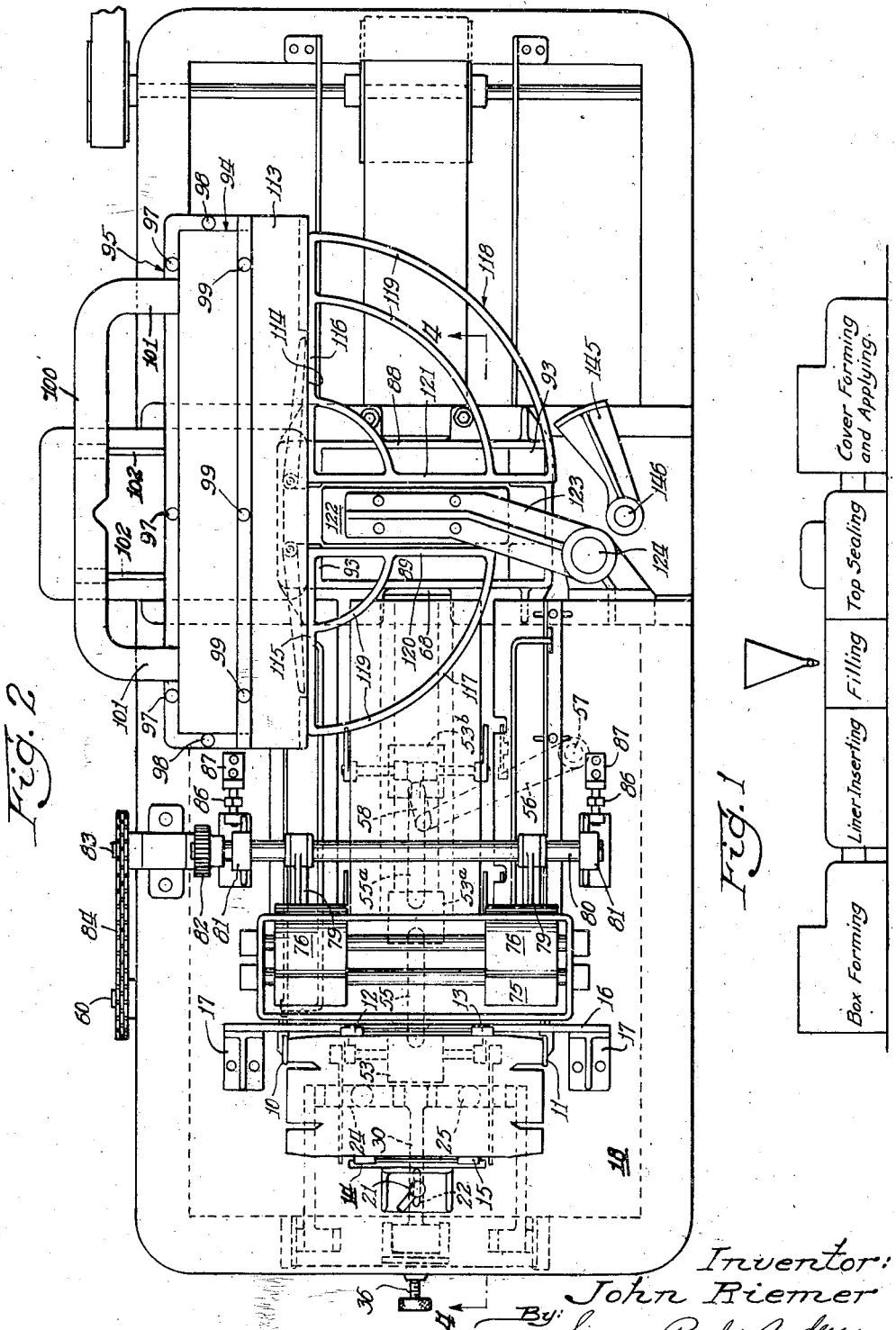

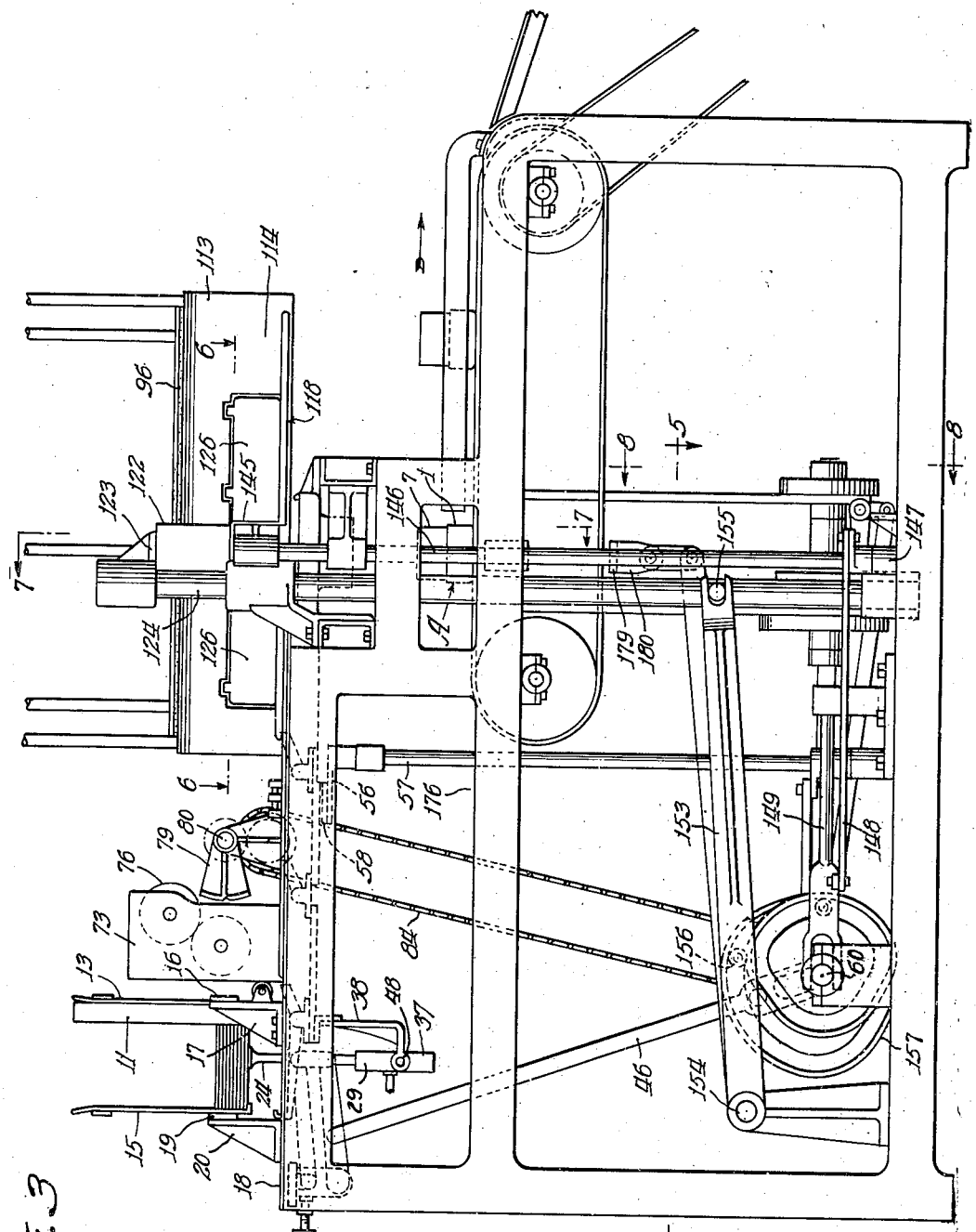

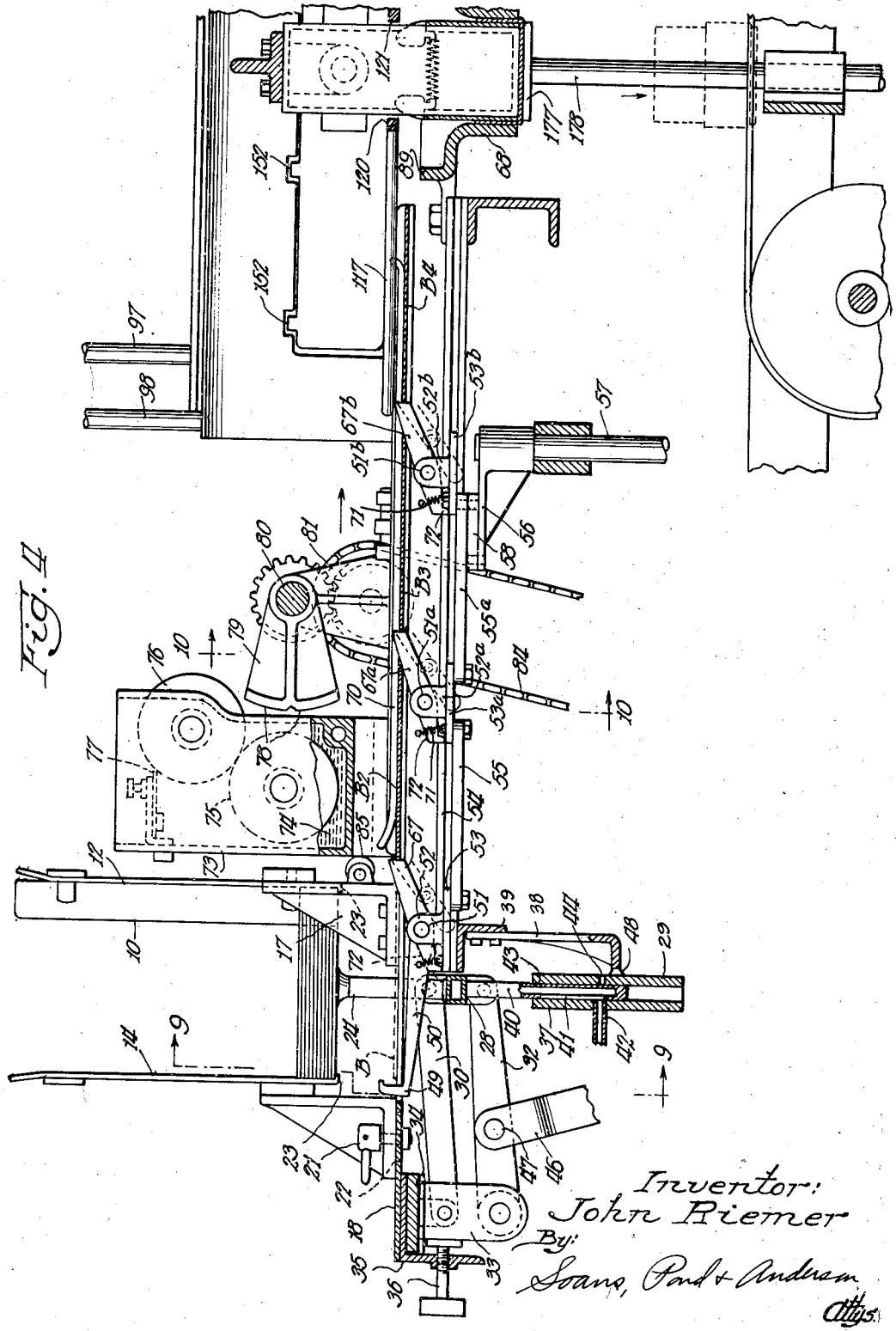

Inventor:
John Riemer
By: Soans, Pond & Anderson
Attys.

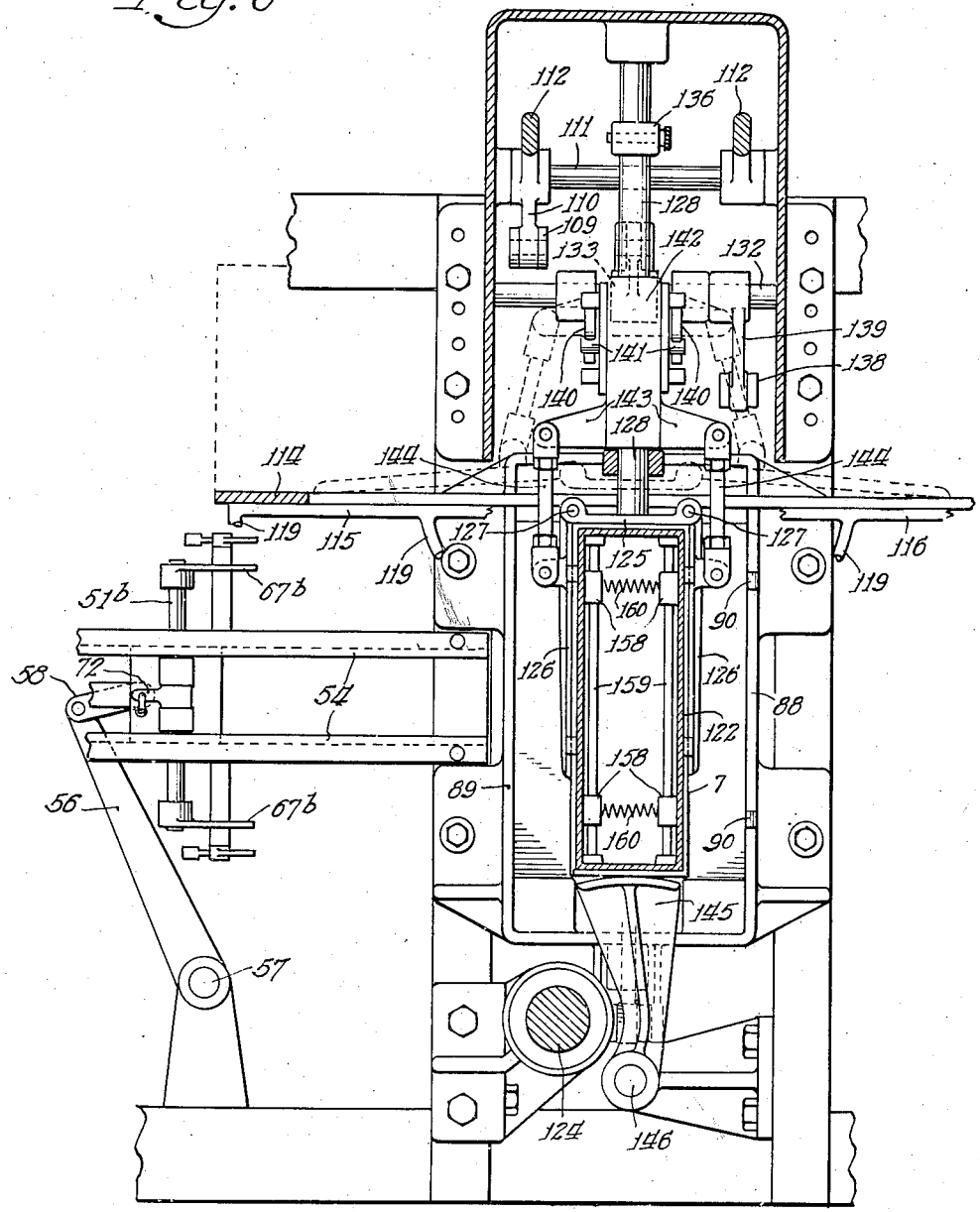

Feb. 15, 1949.    J. RIEMER    2,461,569
PACKAGING APPARATUS

Filed Aug. 29, 1946    13 Sheets-Sheet 6

Inventor:
John Riemer
By: Evans, Pond & Anderson
Attys

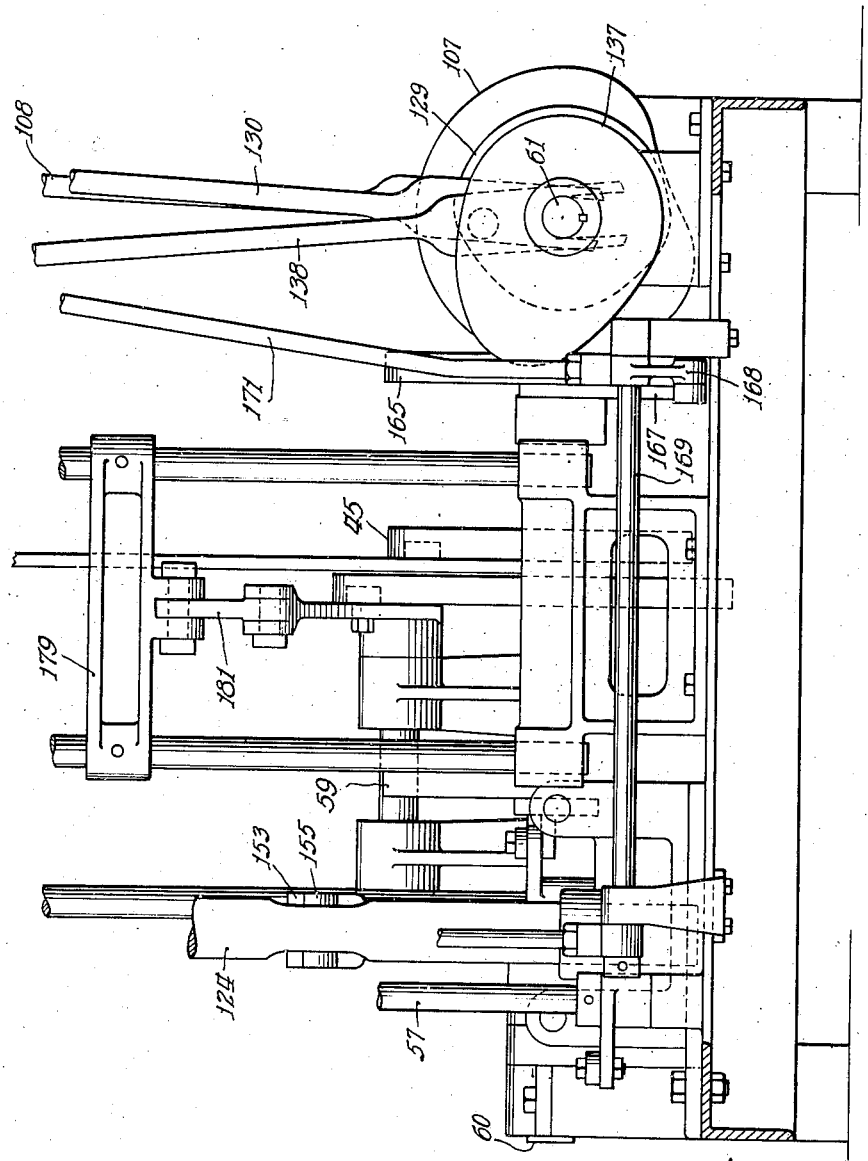

Feb. 15, 1949.  J. RIEMER  2,461,569
PACKAGING APPARATUS
Filed Aug. 29, 1946  13 Sheets-Sheet 8
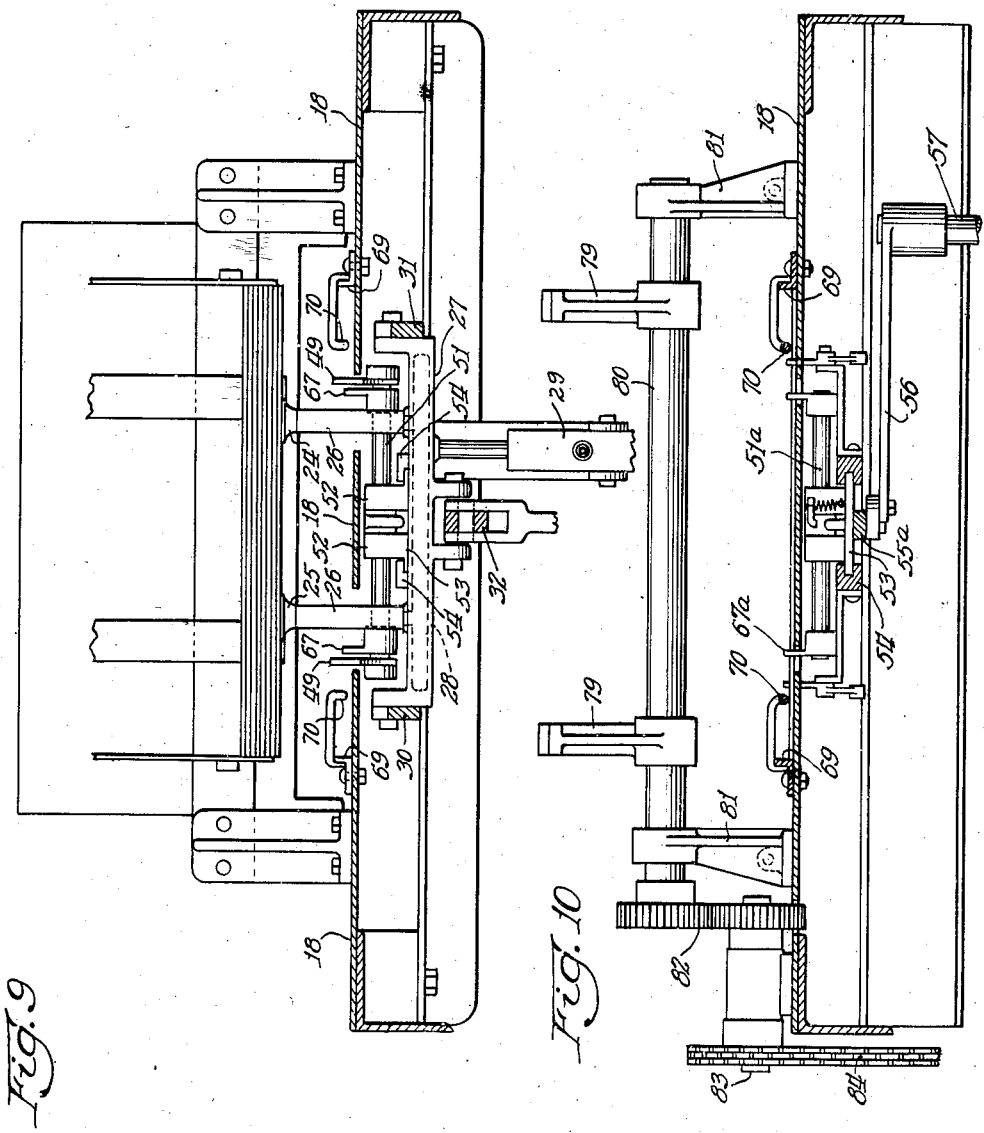
Inventor:
John Riemer
By: Soans, Pond & Anderson
Attys.

Feb. 15, 1949.
J. RIEMER
2,461,569
PACKAGING APPARATUS
Filed Aug. 29, 1946
13 Sheets-Sheet 9
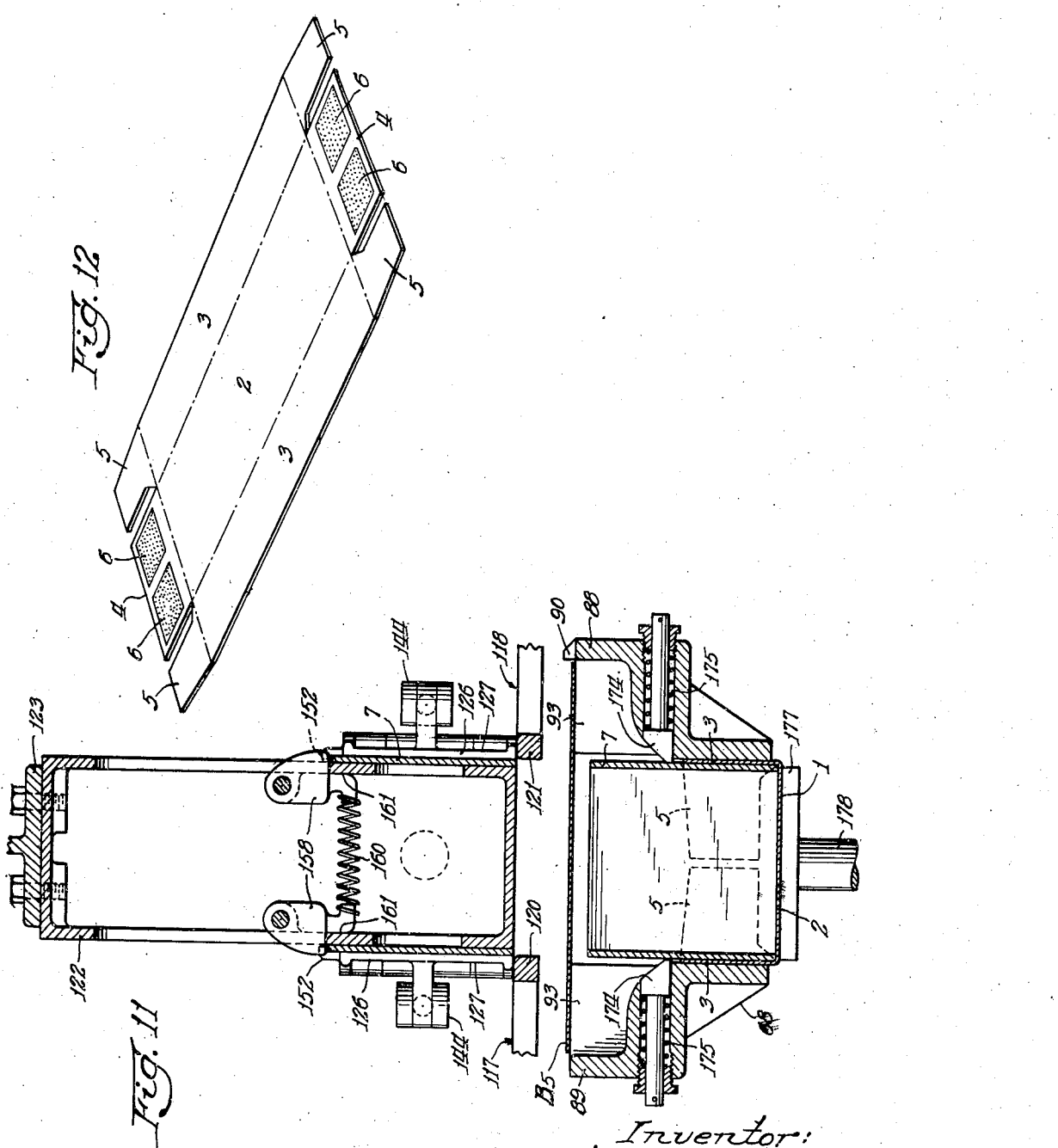
Inventor:
John Riemer
By: Soans, Pond & Anderson
Attys.

Feb. 15, 1949. J. RIEMER 2,461,569
PACKAGING APPARATUS
Filed Aug. 29, 1946 13 Sheets-Sheet 10
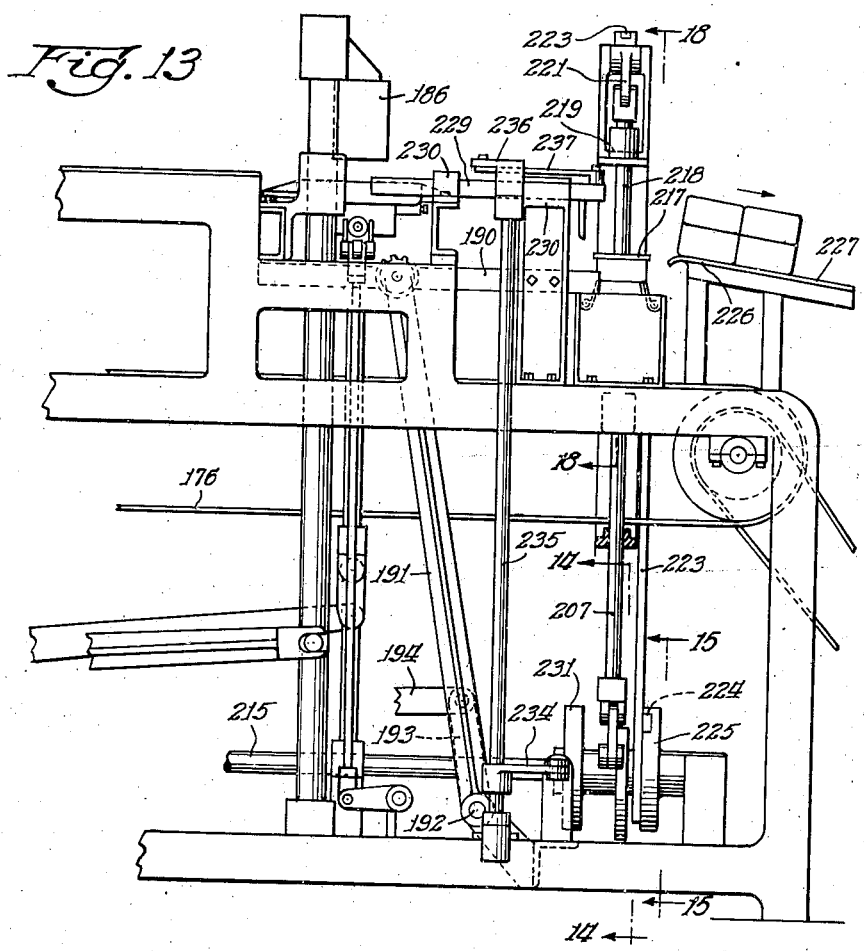
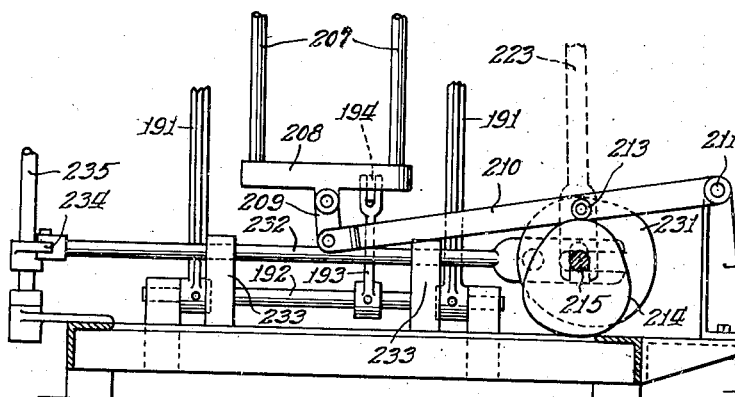
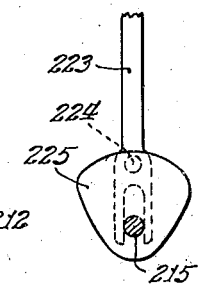
Inventor:
John Riemer
By: Soans, Pond & Anderson
Attys.

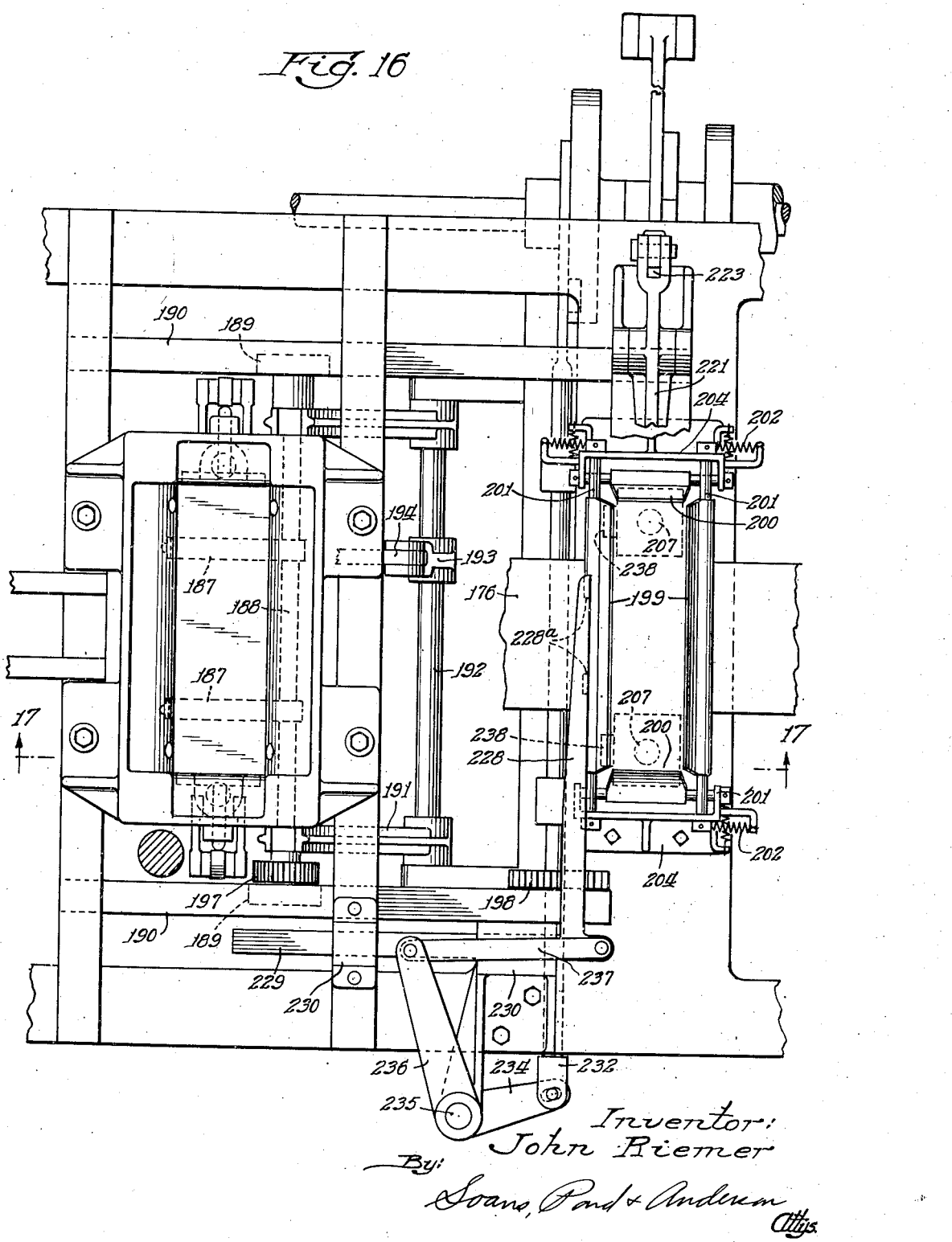

Feb. 15, 1949.   J. RIEMER   2,461,569
PACKAGING APPARATUS
Filed Aug. 29, 1946   13 Sheets-Sheet 12
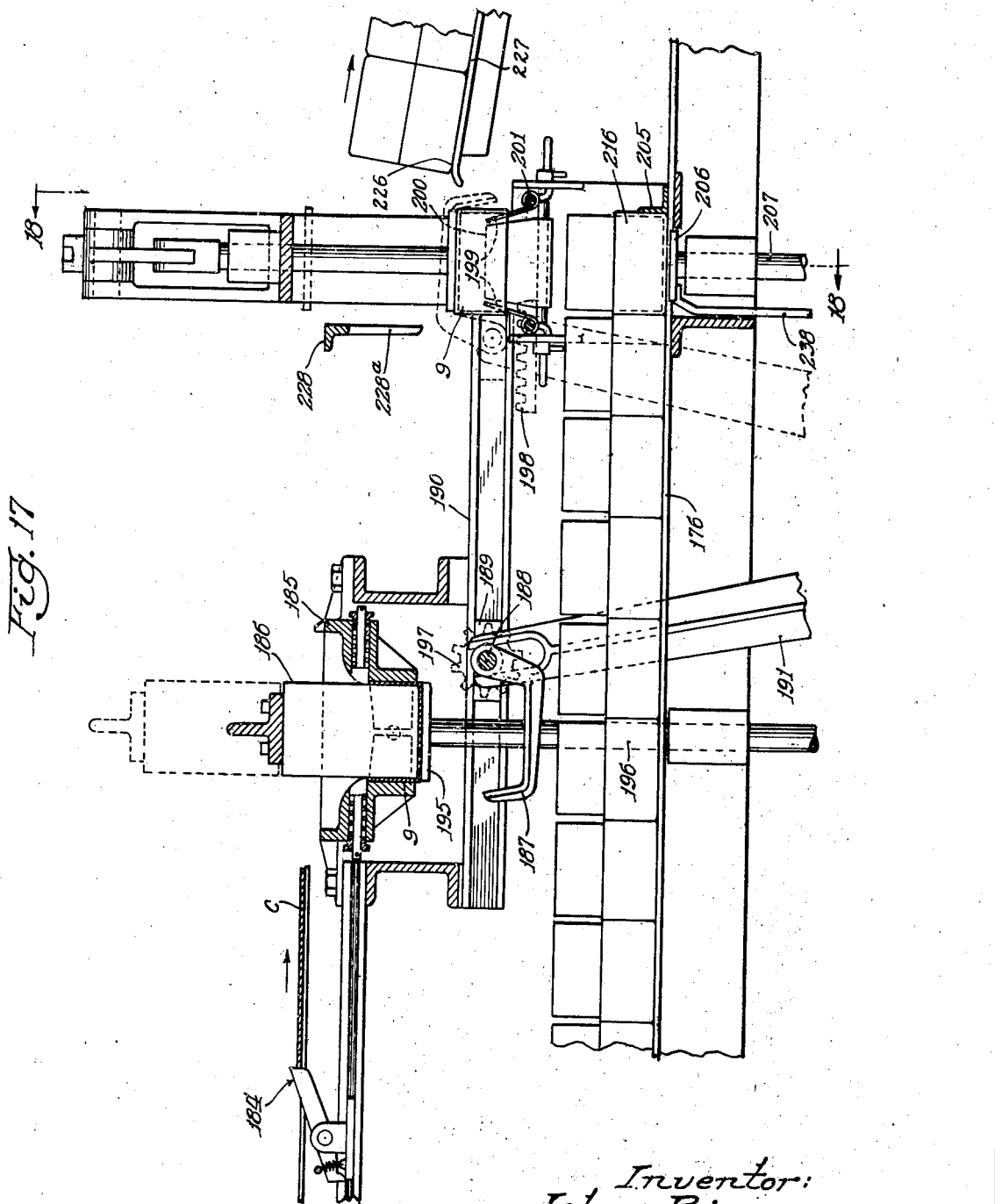
Inventor:
John Riemer
By: Soans, Pond & Anderson
Attys.

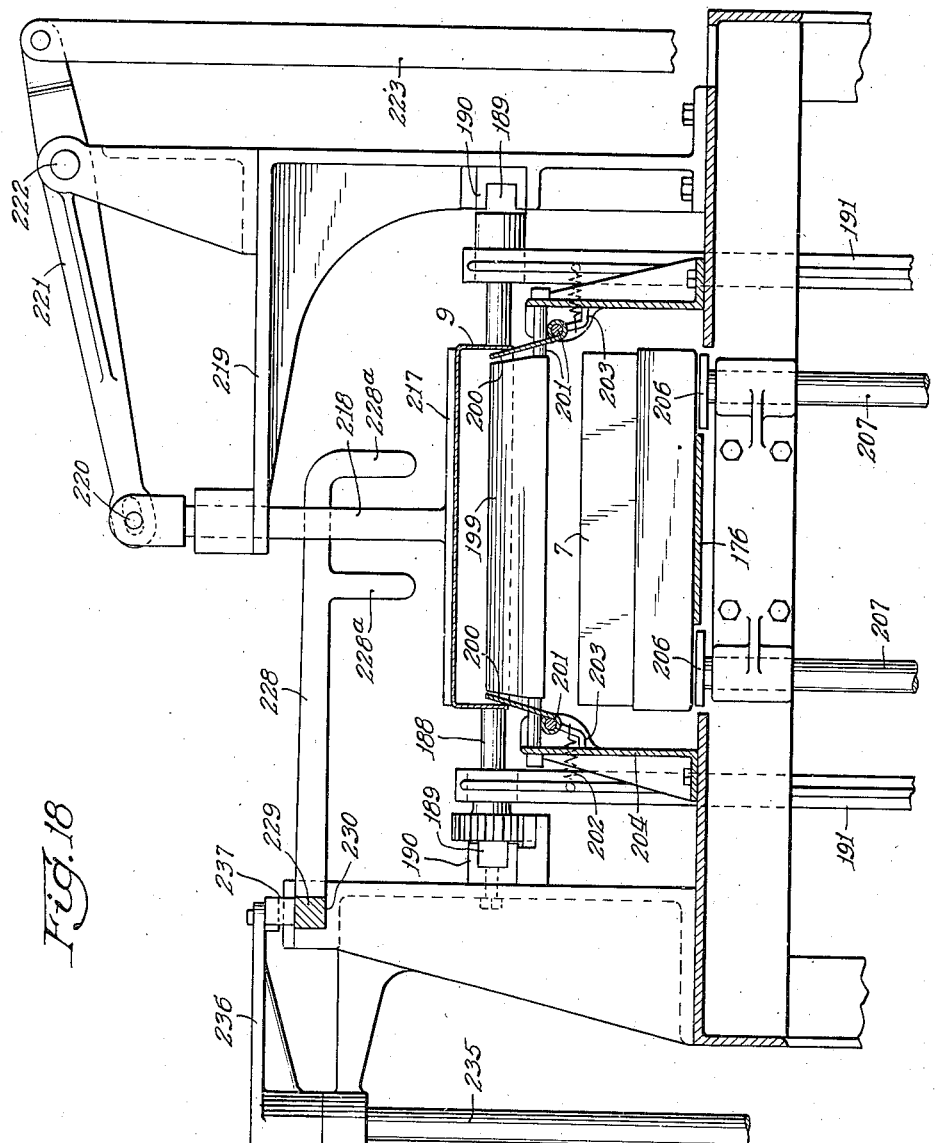

Patented Feb. 15, 1949

2,461,569

UNITED STATES PATENT OFFICE 2,461,569

PACKAGING APPARATUS

John Riemer, Green Bay, Wis., assignor to Kraft Foods Company, a corporation of Delaware Application August 29, 1946, Serial No. 693,782

9 Claims. (Cl. 93—39)

This invention relates to packaging apparatus, and more particularly to apparatus for setting up and assembling a container comprising a tubular body sleeve and a cap-like box member for one end of said sleeve to cooperate therewith to form an open-ended receptacle, and mechanism for forming another cap or box like section and for applying same to said open-ended receptacle to close the same.

The mechanism referred to comprises a pair of units of mechanism which may be closely coupled to form a completely formed and closed empty receptacle, or separated and associated with intervening receptacle lining mechanism, filling mechanism, and liner sealing mechanism, to form a filled, liner sealed and closed package.

The main objects of the invention are to provide efficient mechanism for forming packages of the character above explained; to provide mechanism of the character indicated which may be readily adjusted to form packages of different dimensions; to provide apparatus of the character indicated which may be successfully operated at a high rate of speed; and, in general, it is the object of the invention to provide improved box making equipment or packaging apparatus of the character indicated.

Other objects and advantages of the invention will be understood by reference to the following specification and the accompanying drawings (13 sheets) wherein there is described and illustrated apparatus embodying a selected form of the invention.

In the drawings:

Fig. 1 is a diagrammatic illustration representing the relationship of packaging apparatus embodying box and cover forming units according to the present invention;

Fig. 2 is a plan view;

Fig. 3 is a side elevation;

Fig. 4 is a section on the line 4—4 of Fig. 2 on a somewhat larger scale than Fig. 2;

Fig. 6 is a plan section on the line 6—6 of Figs. 3 and 7;

Fig. 8 is a vertical section on the line 8—8 of Fig. 3;

Figure 7:
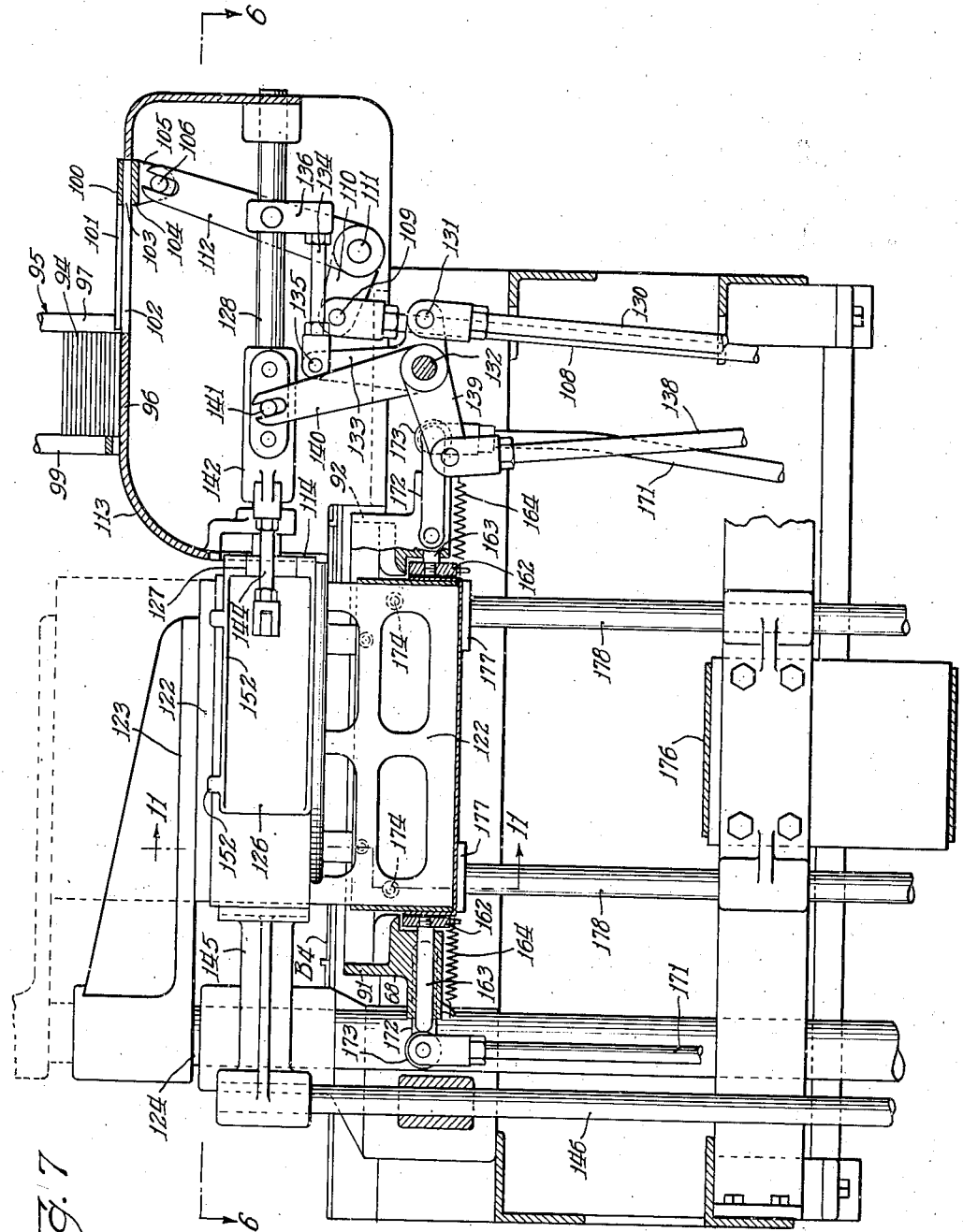
Fig. 7 is a vertical section on the line 7—7 of Fig. 3.

Fig. 9 and 10 are vertical sections respectively on the lines 9—9 and 10—10 of Fig. 4;

Fig. 11 is a vertical section on the line 11—11 of Fig. 7;

Fig. 12 is a perspective illustrating a form of box blank which is converted into a box by the machine;

Fig. 13 is a side elevation of a portion of a unit of mechanism which forms and applies covers to boxes which are formed by the mechanism shown in Figs. 1 to 11, inclusive, and which may be lined, filled and sealed by intervening units of mechanism;

Figs. 14 and 15 are sections respectively on the lines 14—14 and 15—15 of Fig. 13;

Fig. 16 is a plan of the mechanism illustrated in Fig. 13;

Fig. 17 is a vertical section on the line 17—17 of Fig. 16;

Fig. 18 is a vertical section on the line 18—18 of Fig. 13; and

Figs. 19, 20, 21, and 22 are perspectives illustrating various steps in the formation of a package by the illustrated mechanism.

The improved mechanism illustrated in the drawings and hereinafter to be described embodies a magazine for holding a stack of carton blanks of the character shown in Fig. 12, and it is provided with mechanism for feeding such blanks one by one into mechanism which will form the same into an open-topped receptacle such as represented at 1 in Figs. 19 to 22, inclusive. The blank shown in Fig. 12 embodies a central bottom forming panel 2, side wall forming panels 3—3, end wall forming panels 4—4, and end flaps 5—5 extending from the ends of the respective side wall panels 3—3. The side and end wall panels 3—3 and 4—4 are folded upwardly relative to the bottom wall panel 2 to form the four sides of the receptacle 1 and the end flaps 5—5 are positioned inside the end panels 4—4 and are preferably adhesively secured thereto, adhesive being applied to the end wall panels as indicated at 6.

Figures 19, 20, 21, 22:
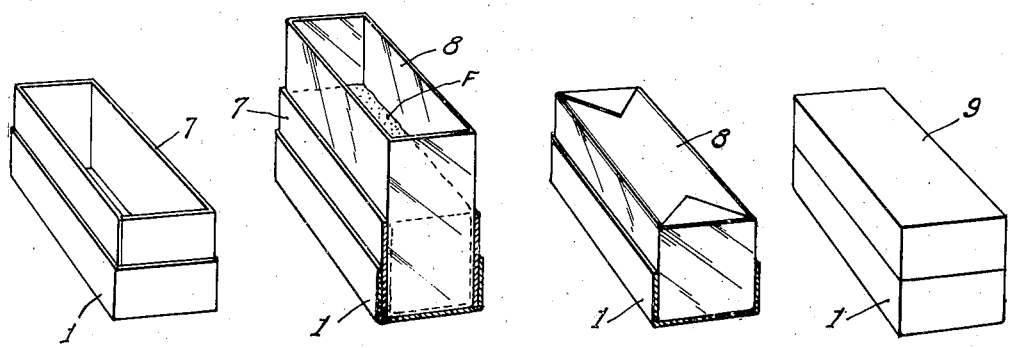

The receptacle 1 has associated with it a tubular body forming member 7 which consists of an elongated strip of suitable material such as cardboard, the strip being suitably scored to facilitate its being folded into the rectangular tubular form best shown in Fig. 19. Said tubular body member 7 is first formed and then brought into engagment with the blank from which the receptacle 1 is formed, the blank being forced through a form die by the tubular body 7 which serves as a mandrel about which the receptacle 1 is formed.

The container embodying the receptacle 1 and the tubular body 7 may then be manually or automatically lined with a suitable liner such as indicated at 8 in Fig. 20, and the lined receptacle filled as indicated at F in Fig. 20. Thereafter, the liner 8 may be closed and sealed as represented in Fig. 21 after which the filled receptacle is delivered into the second unit of mechanism where a cover 9 is applied. The cover 9 is formed from a blank similar to that shown in Fig. 12, such blank being again formed into a receptacle which may be the same as the receptacle 1.

Machines for inserting the liner 8, filling the lined receptacle and closing and sealing the liner, are known in the package filling and closing art, and are not a part of the present invention. Such machines may, however, be associated with the mechanisms for forming and assembling the receptacle 1 and the tubular body 7, and for forming and applying the cover 9, the arrangement being preferably such that there is a continuity of operation which makes for high speed operation.

The mechanism for forming the receptacle 1 and the body 7, and for assembling these elements is shown in Figs. 1 to 11, inclusive. Figs. 13 to 18, inclusive represent the unit of mechanism which forms and applies the cover member 9.

The apparatus for forming the receptacle 1 embodies a magazine for holding a stack of blanks such as represented in Fig. 12, the magazine comprising a pair of upright members 10 and 11 for guiding the opposite ends of the blanks, a pair of upright members 12 and 13 for engaging the leading side edges of the blanks, and a pair of upright members 14 and 15 disposed opposite to the members 12 and 13 for engaging the rear edges of the blanks. The magazine members 10, 11, 12 and 13 are fixedly secured to a normally stationary cross bar 16 which is carried by brackets 17—17, the latter being suitably mounted on the table or top plate 18 of the machine. The rear members 14 and 15 are similarly carried by a cross bar 19 which is in turn carried by a bracket 20, the latter being adjustably mounted on the table top 18 by a suitable clamping screw arrangement indicated at 21 and elongated slot 22. The adjustable mounting of the bracket 20 permits adjustment of the spacing of the members 14 and 15 relative to the front members 12 and 13 so as to accommodate between these front and rear members carton blanks of different sizes. The end members 10 and 11 are similarly adjustably mounted on the cross bar 16 to permit said members 10 and 11 to be adjusted relative to each other to receive between them blanks of different lengths.

The front and rear members 12, 13, 14 and 15 are provided at their lower ends with in-turned ledge forming portions 23 which support the stack of blanks in the magazine.

The box blanks are fed downwardly one by one from the bottom of the magazine by vacuum means comprising a pair of vacuum grippers 24 and 25 which are carried by the upper ends of short pipe lengths 26—26 which extend upwardly from and communicate with a manifold bracket 27. The bracket 27 is hollow as indicated at 28 (see Figs. 4 and 9) and the interior of said bracket communicates through a valve structure 29 with an exhaust pump or other source of vacuum.

The manifold bracket 27 is carried by a pair of upper links or arms 30 and 31 and by a lower link or arm 32, the said links or arms having inner ends pivoted to suitable ears or lugs extending from the manifold bracket 27 as best shown in Figs. 4 and 9. Said links or arms 30, 31 and 32 have their outer ends pivotally mounted in a bracket 33 in such an arrangement that the arms constitute a parallel link arrangement serving to maintain the bracket 27 and the grippers extending upwardly therefrom in substantially vertical position notwithstanding vertical rocking movement which is imparted to the lower arm 32 by means presently to be described. The bracket 33 is horizontally mounted in a suitably slotted supporting plate 34 which is rigidly secured to the angle iron end frame member 35. A screw 36 threaded through an opening in the frame 35 and having its inner end suitably anchored to the bracket 33 facilitates adjustment of the position of the bracket 33 and of the vacuum grippers 24. The adjustment thus made possible permits positioning of the vacuum grippers at the desired point intermediate the opposite side edges of the carton blanks in the magazine.

The arrangement is such that when the grippers are moved upwardly into contact with the bottom surface of the lowermost blank in the magazine, there will be a strong vacuum attachment of the lowermost blank to the gripper so that upon downward movement of the grippers, the lowermost blank will be pulled out of the magazine and deposited on the table 18 in front of feeding mechanism which will presently be described.

When a box blank is delivered to the table 18 in the manner just described, the vacuum in the grippers should be broken and relieved so as to permit subsequent movement of the blank laterally edgewise away from the grippers after which the grippers may again be raised to their gripping position as illustrated in Fig. 4.

The vacuum control valve 29 may consist of a main body 37 fixedly mounted to suitable bracket means such as indicated at 38 on a transverse frame member 39. A valve stem 40 depends from the manifold 28 and is slidable in the bore of the valve body 37. Said valve stem 40 is of tubular form having its lower end closed. At one side the valve stem 40 is provided with an elongated slot 41 which is adapted in certain positions of the valve stem within the body 37 to effect communication between the interior of the valve stem and conduit 42 which is connected to a vacuum pump or other source of vacuum. The valve stem 40 is also provided with a vent or vacuum relief opening 43 which is adapted to register at proper times with a relief or vent opening 44 in the valve body 37. The position of the vacuum conduit 42, the relief opening 44 and the valve openings 41 and 43 is such that when the gripper is in its elevated position communication will be established between the vacuum line 42 through the valve stem opening 41 to the gripper. However, when the gripper is lowered to a predetermined position its vent opening 43 is brought into registry with the vent opening 44 so as to break the vacuum in the gripper to thereby release the blank which is then delivered to the table 18.

The grippers 24 are reciprocated in properly timed relation to the other operating elements of the apparatus by a box cam 45 which acts on a roller carried by a rod 46 which has its upper end pivoted as shown at 47 to the lower arm 32 of the parallel link structure for guiding the vacuum grippers.

The valve body 29 is preferably movably mounted in the forked end portion 48 of the bracket 38 so that said valve body may shift to any extent required by the movement of the valve stem element 40.

Figure 5:
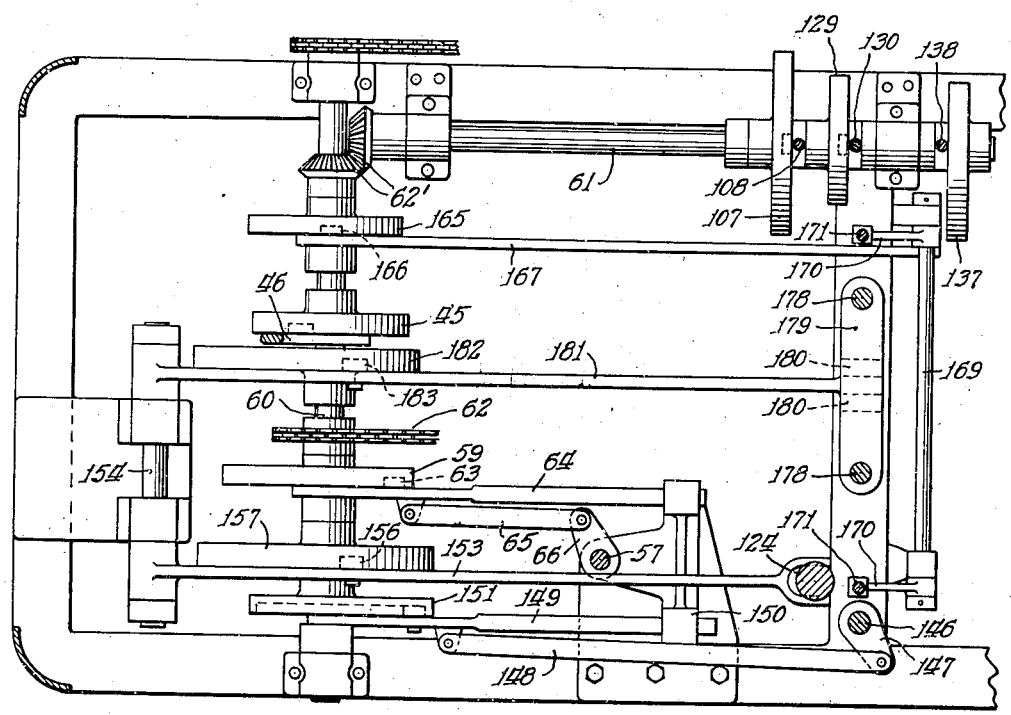
Fig. 5 is a plan section on the line 5—5 of Fig. 3.

The carton blank moved downwardly by the grippers 24 is delivered to the position indicated in dotted lines at B in Fig. 4 immediately in front of the upwarly extending hook end 49 of a feeding pawl 50. The feeding pawl 50 is carried by a shaft 51 which is journalled in suitable bosses 52—52 which extend upwardly from a plate 53, the latter being slidably mounted in an opposed pair of channel members 54—54 (see Fig. 9). The plate 53 is connected by means of a link 55 to another plate 53a which is also slidable in said channels 54—54. The last-mentioned plate 53a is in turn connected by another link 55a to a third sliding plate 53b which is also slidable in said opposed channels 54—54. The three sliding plates 53, 53a and 53b are reciprocated in said channels 54 by means of a rock arm 56 which is carried by a vertically disposed rock shaft 57, the free end of said arm 56 being connected by means of a link 58 to said link 55a and sliding plate 53b. The rock shaft 57 is actuated as best shown in Figs. 3 and 5 by means of a cam 59 carried by a cam shaft 60. The cam shaft 60 and another cam shaft 61 (Fig. 5) are interconnected by bevel gears 62' and these shafts are suitably driven by a chain drive indicated at 62 (Fig. 5) from a prime mover or other suitable connection. The cam 59 acts on a roller 63 carried by a rod 64 so as to reciprocate said rod, it being understood that the cam 59 is a box cam which positively effects reciprocation of said rod. The rod 64 is connected by means of a link 65 to an arm 66 which is secured to said rock shaft 57 so that reciprocating motion of the rod 64 is transformed into rocking movement of the vertical shaft 57.

Forward movement of the slide plate 53 will, of course, carry with it the feeding dog 50 so that the blank delivered to the position B in front of the hook 49 will be advanced to the position represented by the blank shown at B2 in Fig. 4. From the B2 blank position a feeding pawl 67 carried by the shaft 51 will advance a blank to the B3 blank position at the same time that the blank in the position B is advanced to the B2 position. Similarly, a feeding pawl 67a carried by the plate 53a will advance a blank from the B3 blank position to the B4 blank position. Another feeding pawl 67b carried by the slide plate 53b will advance a blank from the B4 position and cause the same to be deposited on the upper end of a female forming die 68. A blank positioned on top of the female forming die 68 is indicated at B5 in Fig. 11.

The feeding pawls 67, 67a and 67b preferably comprise pairs of pawls spaced from each other for engagement with spaced portions of the respective blanks as is best represented in Fig. 9. The blanks are supported by portions of the table plate 18 between upstanding side guides 69—69 and they are held down on said table plate by means of overlying guide rods 70—70 which are suitably anchored at their ends on the respective adjacent side guides 69—69.

The pawls 67a and 67b, like the pawl 67, are secured to their respective shafts 51a and 51b which are journalled in lugs or ears 52a and 52b respectively which extend upwardly from the sliding plates 53a and 53b respectively. Suitable tension springs indicated at 71 in Fig. 4 are stretched between portions of the respective sliding plates 53, 53a, 53b and suitable bent supporting pins which project upwardly and laterally from portions of short arms 72 which extend from the shafts 51, 51a and 51b as shown. The arms 72 have free end portions which are adapted to bear on the respective slide plates 53, 53a and 53b to limit the rocking movement imparted to the feed dogs 67, 67a and 67b by the said springs 71.

Upon return movement of the feed plates 53, 53a and 53b, the pawls 67, 67a and 67b are depressed by the overlying box blanks so as to ride under said blanks. The feed pawl 50 is thereby rocked upwardly but there is no objection to such upward movement of the pawl 50 since there would at that time be no box blank in the position B.

During the movement of the box blanks from the position B2 to the position B3, adhesive is applied in the areas represented at 6—6 in Fig. 13. For that purpose, there is provided a receptacle 73 for liquid adhesive 74. Said receptacle straddles the path of travel of the box blanks and is supported on the table plate 18 at points outwardly of the respective box blanks. The receptacle contains a pair of rollers 75 which are adapted to pick up a coating of the adhesive and apply it to a similar pair of transfer or platen rollers 76 which are also journalled in the receptacle. Said transfer rollers 76 may have associated with them a suitable doctor blade 77 for controlling the amount of adhesive which will be carried by the surface of the rollers. The rollers 76 are adapted to be engaged by the coating surfaces 78—78 of coating segments 79 which are carried by a shaft 80. The shaft 80 is suitably journalled in brackets such as indicated at 81 (see Figs. 4 and 10) and it is connected by gearing indicated at 82 to a suitably journalled shaft 83 which is driven by a chain drive 84 from the cam shaft 60. The shaft 80 is thereby driven in predetermined timed relation to the feed movements of the box blanks and the timing is, of course, such that the coating surfaces of the segments will engage the required portions of each of the box blanks passing under the shaft 80.

The adhesive receptacle 73 with its rollers 75 and 76 is normally held in the required position for applying adhesive to the coating surfaces of the segments 79 by means of one or more eccentrically mounted rollers 85, the latter being carried by a shaft suitably journalled on the brackets 17 of the box blank magazine. The eccentric rolls 85 are adapted to be manually turned so as to permit the receptacle to be moved toward the box blank magazine thereby to move the adhesive transfer roller 76 away from the path of movement of the coating segments 79 when desired. This arrangement also permits accurate adjustment of the position of the adhesive transfer rollers 76 relative to the path of travel of the coating surfaces of the coating segments 79. The coating segments may be also adjusted by means of adjusting screws 86—86 which have their opposite end portions oppositely threaded and engaged with suitably threaded openings in the brackets 81 and fixed brackets 87—87 which are mounted on the table plate 18. The normal slack in the driving chain 84 will permit a desirable amount of adjustment of the coating segments by means of the described adjusting screws 86—86. The described adjustability of the adhesive container 73 and of the coating segments serves also to permit application of adhesive accurately in predetermined positions on box blanks of different sizes which may be handled by the machine.

The female die member 68 to which the blanks are delivered as represented at B5 in Fig. 11 embodies front and rear flange-like portions 88 and 89, the same being spaced from each other a distance approximately equal to just slightly more than the front to rear dimension of the box blanks as clearly shown in Fig. 11. The front flange 88 is desirably equipped with suitable upstanding ears or bosses 90 which serve to stop the blank B5 in proper position. At its opposite ends, the die 68 has similar upstanding flange portions 91 and 92 (see Fig. 7), said flange portions being spaced from each other a distance approximately the same as the end to end dimension of the box blanks or just slightly more as clearly indicated in Fig. 7. When the box blank B4 is fed to the B5 blank position, the blank will come to rest in the B5 position of Fig. 11 at the top edge of the die by reason of engagement of the corner flap portions 5 of the blank with corner portions 93 (Figs. 2 and 11) of the die 68. It will be understood that although the blank is scored or creased as aforesaid to facilitate folding the same into box form, it is nevertheless stiff enough to be self-supporting in flat condition as illustrated in Fig. 11 by engagement of its corner flaps 5 with the underlying supporting portions 92.

A tubular body member 7 is formed and positioned above the box blank B5 and is fed downwardly together with the box blank B5 through the die 68 which is so formed as to fold the box blank around the lower portion of the tubular body member as is shown in Fig. 11 where one of the tubular bodies 7 is shown seated within a box or receptacle 1 in the lower portion of the die and below the box blank B5.

The tubular body member 7 is formed from a suitable elongated and scored or creased blank, as heretofore explained, a stack 94 of such blanks being placed in a magazine 95 provided as a part of the machine. The magazine 95 consists of a bottom plate 96 and a plurality of upwardly extending rear posts 97, a pair of end posts 98 and a plurality of front posts 99 which are so arranged as to confine and support the stack 94 of body blanks. The rear posts 97 and end posts 98 extend upwardly directly from the plate 96, but the front posts 99 are suitably supported in such a manner that their lower ends are spaced from the table 96 a distance slightly greater than the thickness of the body blanks. The body blanks are fed from the bottom of the stack 94 one by one by means of a reciprocating slide 100 which has forwardly extending end arm portions 101 arranged to engage the rear edge of the lowermost body blank near the ends thereof as is best shown in Fig. 2.

The pusher 100 is slidably mounted on the table 96 and is guided thereon in slots 102 through which portions 103 of the pusher extend. The pusher portions 103 have secured to them members 104 which have depending lugs 105 provided with laterally extending pins or studs 106 (see Fig. 7).

The pusher is reciprocated by means of a box cam 107 carried by the cam shaft 61 which acts on a roller carried by a rod 108 which has its lower end forked to straddle the cam shaft 61 so as to be guided thereby for vertical movement, the upper end of said rod 108 being pivoted as shown at 109 to the free end of an arm 110 carried by a rock shaft 111 (see Figs. 5, 7 and 8). The rock shaft 111 has secured to it a pair of rock arms 112—112 (see Figs. 6 and 7) which extend upwardly and have their upper ends forked to straddle the studs 106 which extend from the depending brackets 105 of the pusher member 100. It will be seen that vertical reciprocating motion imparted to the rod 108 by the cam 107 will be transformed by the bell crank lever arrangement of the arms 110 and 112 into horizontal reciprocation of the pusher member 100.

The lowermost body blank, upon being fed from the magazine 95, gravitates over the rounded forward portion 113 of the table plate 96 and comes to rest in a vertically disposed position in front of the vertical portion 114 of said table plate (see Fig. 7). The body blank rests on ledges 115 and 116 formed by a portion of grill-like frames 117 and 118, respectively, the curved bars 119 of which are provided for supporting the body blank during its folding into tubular form as will presently be explained, said curved bar portions 119 of the grills may be rigidly connected or formed integral with said ledge portions 115 and 116, and their opposite ends are rigidly or integrally connected to bar portions 120 and 121 respectively. The grills 117 and 118 are not required to support much weight, and they may be adequately supported by attachment to the said wall 114.

A mandrel 122 is supported in vertically aligned relation to the opening through the forming die 68, the said mandrel being supported for vertical movement by attachment to a bracket or arm 123 which is secured to the upper end of a vertically slidably mounted shaft 124. One end of the mandrel is spaced from the said wall 114 sufficiently to permit the body blank to enter the space between the mandrel and said wall 114 and means are provided for acting on said blank to fold it around said mandrel. Folding of the blank occurs when the mandrel is in a lowered position as illustrated in full lines in Fig. 7. The folding mechanism comprises a plate 125 which has a pair of folding wings 126—126 hingedly connected to its opposite ends as shown at 127—127. The plate 125 is carried by one end of a horizontally, slidably mounted shaft 128, the said shaft being mounted in suitably apertured bosses or frame portions as represented in Figs. 6 and 7. The shaft 128 and with it the folder plate 125 is reciprocated by means of a box cam 129 carried by the cam shaft 61 (see Fig. 5) which acts on a roller carried by the lower end of a vertically movable rod 130 having its lower end bifurcated and straddling the said shaft so as to be guided thereby. The upper end of the rod 130 is pivoted as indicated at 131 (Fig. 7) to one arm of a bell crank which is rockably mounted on a suitably supported shaft 132, the other arm 133 of which bell crank has pivoted to it a rod 134 as shown at 135. The other end of the rod 134 is secured to an arm 136 which depends from and is suitably secured to the said shaft 128. Rocking movement imparted to the bell crank arm 133 will, of course, be transformed into horizontal reciprocating movement of the shaft 128 and the said folding plate member 125.

The folding wings 126—126 are rocked on their pivots 127 by means of another box cam 137 which is also carried by said cam shaft 61. The box cam 137 acts on a roller carried by a rod 138, the upper end of which is pivoted to the free end of a rock arm 139 which is secured to said shaft 132 which is suitably jornalled in the supporting frame structure for rocking movement. A pair of relatively spaced arms 140—140 are mounted on said rock shaft 132 to rock therewith, and the upper ends of said arms are slotted to embrace ears or studs 141—141 which extend laterally from the sides of a sleeve-like member 142 which is slidably mounted on the shaft 128. The sleeve 142 is provided with oppositely extending ears 143—143 which have their outer ends connected by means of links 144—144 to the respective folding plates 126—126. It will be seen that sliding movement imparted to the sleeve 142 will effect rocking movement of the folding plates 126 about their pivots 127. Such movement is, of course, effected mainly after the end plate 125 comes to rest, this member being first advanced so as to more or less clamp a body blank against the adjacent side wall of the mandrel. Thereafter the folding wings 126—126 are actuated to fold portions of the body blank across the opposite wide walls of the mandrel as is shown in Fig. 6. An end portion of the blank remains to be folded across the opposite narrow side of the mandrel, and this is effected by means of a folder 145 which is carried by the upper end of a vertically disposed rock shaft 146. The rock shaft 146 is suitably journalled in bearings carried by the frame structure of the machine, and its lower end has secured to it an arm 147 (see Figs. 3 and 5) which has connected to it one end of a link 148, the other end of which is connected to a rod 149. The rod 149 has one end slidably mounted in a suitably supported bearing 150 and its other end forked and embracing the cam shaft 60 adjacent a cam 151 on said shaft. The cam 151 acts on a roller carried by the said rod 149 to reciprocate the latter and such movement is transmitted by the link 148 to the arm 147 whereby the shaft 146 is rocked so as to cause the folder 145 to sweep across the adjacent narrow side wall of the mandrel to thereby fold the said remaining end portion of the tubular body blank across said wall of the mandrel.

After a tubular body has been formed around the upper portion of the mandrel, the mandrel is moved upwardly from the position shown in Figs. 4 and 7 to the elevated position in which it is illustrated in Fig. 11. During such upward movement of the mandrel the tubular body member formed on its upper portion is held against upward movement with the mandrel by means of ears such as indicated at 152 formed on the upper edges of the folding plates 126, said ears overlying the upper edges of the opposite walls of said tubular body member 7. Vertical movement of the mandrel is, of course, effected by moving its supporting shaft 124 vertically. The shaft 124 is actuated by means of a long arm 153 which is pivotally mounted on one end as shown at 154 on a suitable bracket carried by the frame of the machine, the other end of the arm being suitably forked to embrace the shaft 124 and provided with slots straddling the projecting end portions of a pin 155 which extends through a portion of said shaft 124 (see Figs. 3, 5 and 8). The arm 153 is provided with a roller 156 which engages a box cam 157 carried by said cam shaft 60 and so formed as to impart rocking movement to said arm 153 and vertical reciprocating movement to said mandrel carrying shaft 146.

The mandrel being in its elevated position as shown in Fig. 11, a box blank will be delivered to the position B5 over the die member 68. Thereafter the mandrel will be lowered and the tubular body member previously formed on the upper portion of the mandrel but now located on the lowered portion thereof as shown in Fig. 11 will be moved downwardly to press the box blank through the die and to form the blank into a receptacle about the lower portion of said tubular body member. To insure unitary downward movement of the mandrel 122 and the tubular body 7, the mandrel is provided in its opposite wide faces with pairs of dogs 158 which are arranged to project upwardly from the respective faces of the mandrel to overlie the upper edge of the tubular body member located on the lower end portion of the mandrel. As shown in Figs. 6 and 11, said dogs 158 are pivotally supported by shafts 159 mounted on the inside of the mandrel and resiliently urged outwardly of the mandrel by interposed springs 160. The outward rocking movement of the dogs 158 is limited by engagement of the spring receiving prongs with the inside faces of the respective walls of the mandrel as indicated at 161. When the mandrel is moved upwardly through a tubular body 7 formed on the upper portion of the mandrel, said dogs 158 are forced inwardly by the tubular body walls and offer no material resistance to the indicated movement of the mandrel through the tubular body. However, the squared lower edge portions of the mandrels are arranged to abut the upper edges of the tubular body so that downward movement of the mandrel will be positively transmitted to said tubular body member as will be readily understood by examination of Fig. 11.

The mandrel and the tubular body 7 act together to force a box blank downwardly through the die 68 and said die is so formed that the end flaps 5—5 of the blank will first be folded upwardly relative to the side wall panels 3—3 from which said flaps extend, after which the side walls 3—3 and end walls 4—4 will be folded upwardly into right-angular relationship to the bottom panel 2.

While the mandrel remains in its lowered position as illustrated in Fig. 7, pressure is applied to the end walls 4 of the receptacle to insure intimate engagement thereof with the corner flaps 5 thereby to effect secure adhesion of said end walls to said corner flaps, and thereby to insure permanence of the box formation when the box blank has been folded.

For the purpose of applying such pressure to the end walls, the die 68 is suitably recessed at its ends to house end pressure plates 162—162, the same being mounted for horizontal sliding movement toward and from the mandrel by being secured to end portions of shaft or stem-like members 163 which are slidably seated in suitably formed portions of the die 68. Coil springs 164 stretched between portions of the die and the respective pressure plates serve to normally hold said pressure plates retracted into the recesses formed in the die. The pressure plates are periodically forced inwardly to squeeze overlapping end wall and flap portions against the adjacent portion of the tubular body wall and against the adjacent end of the mandrel. The means for so moving the pressure plates comprises a box cam 165 carried by the cam shaft 60 which acts against a roller 166 carried by an adjacent portion of a rod 167. The rod 167 has one end forked and straddling the cam shaft 60 so as to be supported and guided thereby, and its other end is pivoted to an arm 168 which depends from a rock shaft 169 suitably supported from the framework of the machine (see Figs. 5 and 8). The rock shaft 169 has secured to its opposite end arms 170—170 which have their inner ends pivoted to the lower ends of upwardly extending rods 171—171. The upper ends of the rods 171 are pivoted to the outer ends of short links 172—172, the inner ends of which are pivoted on portions of the die 68 as best shown in Fig. 7. The rods 171 are provided at their upper ends with rollers 173—173 which are adapted to engage the outer ends of the pressure plate carrying pins 163. The arrangement is such that when the axis of the respective rolls 173 is aligned with the axis of the pressure plate pins, the pressure plate will have been forced inwardly into pressure applying position as illustrated in Fig. 7. Vertical movement of the said rolls from said axially aligned relationship to the pins 163 will, of course, permit the springs 164 to retract the pressure plates so as to relieve the pressure on the box parts preparatory to withdrawal of the mandrel from within the tubular body of the box structure.

The box structure including the receptacle 1 and the tubular body 7 is held against upward movement with the mandrel by means of pressure dogs 174 which are horizontally slidably mounted in suitable openings provided in the die (see Fig. 11), said dogs being urged by suitable coil springs 175 to move inwardly into engagement with the tubular body portion of the box structure. The springs 175 are of such strength that the narrow inner ends of the dogs will bite into the tubular body walls sufficiently to prevent the tubular body from following the mandrel upwardly when the latter is moved from its lowermost position to its uppermost position. The upper faces of said dogs are beveled as shown to facilitate downward movement of the receptacle 1 between the opposed dogs, and said dogs are preferably located so as to engage the box structure adjacent its ends where the end walls will serve to prevent inward collapsing of the body walls by the pressure of said dogs.

The receptacle thus left within the opening of the die 68 will be forced downwardly and out of the die by the next formed box and tubular body. The receptacle being ejected from the die is lowered to a conveyor 176 to the position shown at A in Fig. 3. For effecting controlled movement of the receptacle downwardly to the conveyor 176, elevators are provided in the form of plates 177—177 on the upper ends of vertically slidably mounted shafts 178-178. Said shafts 178 are secured at their lower ends to a cross-head 179 (see Figs. 3 and 5). Spaced ears 180 depend from said crosshead approximately midway between the said shafts 178. An arm 181 has one end pivoted to said cross-head between said ears 180 and its other end pivotally mounted on the shaft 154. Said arm 181 is rocked vertically about the axis of the shaft 154 by means of a suitable cam 182 which acts on a roller 183 carried by said arm 181. The cam 182 is so formed as to effect lowering of the elevator plates 177 in properly timed relation with the downward movement of the mandrel 122 by means of which the box structure within the die opening is expelled therefrom. The downward movement of said elevator plates 177 is, of course, continued beyond movement required by the formation of a new box structure so as to deposit the ejected box on the conveyor 176 as will be readily understood by examination of Fig. 7.

The various cams employed are preferably in the form of box cams, and such cams serve to positively reciprocate or rock the various parts in both directions of movement. If desired, simple peripheral or face cams may be employed in connection with springs for effecting traction of the various parts. Such and other substitutions of equivalent elements or mechanisms may, of course, be made.

To adapt the mechanism to the handling of tubular body blanks of different sizes, the mandrel 122 may be removed from its supporting arm 123 and replaced by another of the desired size. Similarly, the die structure 68 as an entire unit may be replaced by others of the desired size. The tubular body blank magazine feeding and folding plates may similarly be replaced as a unit. It will be observed that relatively few connections need to be changed and that those requiring changing are of simple form so as to be easy to change.

A receptacle comprising the box 1 and the tubular body 7 thus formed and delivered to the conveyor 176 may be carried by the conveyor into mechanism for inserting the open lining 8 as shown in Fig. 20 and thence to mechanism for delivering the fill F of the desired material into the lined receptacle. The liner of the filled receptacle may be then closed and sealed by other mechanism to which the package is carried by said conveyor, thereby producing the closed and sealed package structure illustrated in Fig. 21. The package is then ready for the application of a cover unit 9 as represented in Fig. 22.

For applying a cover unit 9, the mechanism shown in Figs. 13 to 18 of the drawings is provided. The cover forming and applying mechanism embodies blank feeding mechanism represented at 184, said feeding mechanism being substantially the same as the box blank feeding mechanism of the box forming unit already described. The cover blanks represented at C in Fig. 17 are fed to a die 185 which may be the same as the die 68, and a mandrel 186 movable into and out of said die is provided for cooperating with the die to form said cover blanks into receptacles in substantially the same manner that the box members 1 are formed. The mandrel in this instance may be a simple rectangular walled device inasmuch as it is not required to be moved through a tubular wall body as is the previously described mandrel 122. The cover blanks C are formed into covers 9 within the die 185 as shown in Fig. 17, it being understood that the mandrel is made of appropriate size to fit snugly within the formed cover as distinguished from a size to fit within the tubular body. Also, instead of forcing the cover member 9 out of the die by means of the next formed cover, it is preferable that the mandrel 186 be moved through the die to such an extent as to cooperate with the die to form the cover and to eject the cover from the die before starting its retraction or upward movement. The covers will normally fall off the lower end of the mandrel when the covers are freed from the constricting effect of the surrounding die. However, any of various known means may be employed for insuring separation of the formed cover from the mandrel incident to the retraction of the latter. Such means may comprise spring actuated plungers carried by the mandrel, or blast means arranged to blow the cover off the mandrel, and the like. Such details are not a part of the present invention, and, hence, are not illustrated.

The formed covers 9 are delivered from the die 185 into a pair of upwardly facing U-shaped arms 187—187 (see Figs. 16 and 17) which are secured at one end to a rock shaft 188 which is rotatably mounted in slidable bearing blocks 189. The bearing blocks 189 are horizontally, slidably mounted in suitable channel-shaped members 190—190. Horizontal shifting motion is imparted to the bearing blocks 189 and to the shaft 188 and parts carried thereby by means of a pair of arms 191—191 which have their upper ends formed to straddle portions of the shaft 188 or suitable anti-friction bearing collars thereon. The lower ends of said arms 191 are secured to a suitably journalled rock shaft 192. Said rock shaft 192 also has secured to it an upwardly extending arm 193 which is connected by means of a link 194 to suitable cam mechanism for imparting the required rocking motion to said shaft. The cam mechanism is not herein illustrated, but may be of the same general character as that hereinbefore described for actuating other rock shafts.

It should be understood that the covers 9 are not merely thrown into the U-shaped receiving arms 187, but that they are delivered under control by the mandrel 186 and suitable elevator members 195 carried by the upper ends of vertically reciprocable shafts 196 which may be actuated by cam mechanism similar to that described for controlling the elevators 177.

The cover 9 having been delivered to the carrier arms 187 is next advanced horizontally by imparting rocking movement to said arms 191. Near the end of the horizontal advancing movement of said carrier arms 187, they are rotated through an arc 180° so as to deliver the covers 9 in inverted position relative to the position in which they are formed, or, in other words, in normal cover position ready for application to a filled container. To effect such rotation of the cover carrying arms 187, the shaft 188 has a gear 197 secured to it and said gear is adapted to mesh with a section of a gear rack 198 which may be supported by means of a suitable bracket depending from the adjacent channel guide 190. It will be seen that when the shaft 188 reaches a position over the gear rack 198, the gear 197 will come into mesh with said rack 198 and thereby effect rotation of the cover carrying arms to the dotted line position illustrated in Fig. 17 as an incident to the final portion of the horizontal movement of said shaft 188.

The cover member 9 is delivered in outwardly telescoped relation to upwardly converging funnel side plates 199—199 and upwardly converging funnel end plates 200. Said funnel plates 199 and 200 are secured to shafts 201 which are journalled for rotation in suitable mounting brackets as best shown in Fig. 16. Suitable spring means 202 are provided in association with each of the said funnel plate shafts to resiliently urge the same into said upwardly converging relation, such movement being suitably limited as by engagement of pins 203 extending from the shafts 201 with adjacent portions of the supporting brackets 204.

The box cover 9 will rest on the converged upper end portions of said funnel plates as shown in Fig. 18 and the cover carrying and inverting arms 187 will be returned to their initial receiving position as shown in full lines in Fig. 17.

The conveyor 176, previously referred to, is arranged to carry the receptacles through the lining, filling, and sealing mechanism and into the cover applying mechanism, the filled and closed packages being disposed in side to side relationship on the conveyor as illustrated in Fig. 17. A stop member 205 suitably mounted on the frame structure serves to limit the forward movement of the packages with the conveyor 176, thereby to position the leading package in vertically aligned relationship to the funnel structure formed by the funnel plates 199 and 200.

The next operation is that of elevating the foremost package structure through the funnel plates and into the overlyng cover 9. This is effected by means of an elevator structure comprising plates 206—206 mounted on the upper ends of vertically slidably mounted shafts 207—207. The shafts 207 have their lower ends secured to a suitable cross-head 208 which is connected by means of a link 209 to the free end of a rock arm 210, the other end of which is pivotally mounted as indicated at 211 on a stationary bracket 212. The arm or lever 210 carries a cam engaging roller 213 which is engaged by the periphery of a rotating cam 214 carried by a cam shaft 215 which is driven by any suitable means in properly timed relationship to the various operating parts of the mechanism. The cam 214 is operative to effect vertical movement of the shafts 207 and elevator plates 206 and thereby to elevate the foremost package 216 and to pass the same upwardly through said funnel structure and into the overlying cover 9 in a manner which is readily apparent from an inspection of Figs. 17 and 18.

To prevent the cover 9 from being prematurely lifted from the funnel structure, there is provided a control comprising a top plate 217 which is carried by the lower end of a vertical reciprocably mounted shaft 218 as shown in Figs. 13, 17 and 18, said shaft 218 is slidably mounted in a suitably apertured bracket 219 which is fixedly mounted on the frame structure of the machine. The upper end of the shaft 218 is pivotally and laterally slidably connected as indicated at 220 to one end of an arm or lever 221 which is pivoted intermediate its ends as shown at 222 on a bracket member extending upwardly from the bracket 219. The opposite end of the lever 221 has pivoted to it a link 223 which extends downwardly and has its lower end forked to fit around the cam shaft 215. The said link 223 is provided with a roller 224 which cooperates with a box cam 225 to effect vertical reciprocation of the link 223 incident to the rotation of the cam 225.

The cam 225 is formed to effect upward movement of the control plate 217 in such timed relation to the outward movement of the elevators 206 that the upper portion of the tubular body element 7 of the filled package will be entered into the cover 9 overlying the funnel structure before the cover is permitted to move upwardly from said funnel structure. After such introduction is effected, there may be concurrent movement of the package elevators and the cover control 217, but the movement should be so related that by the time that the cover controlling element 217 reaches its uppermost position, the elevators 206 will have caused the tubular body portion 7 of the filled package to be completely inserted into the cover structure.

When the elevators 206 are in their uppermost position, they are approximately horizontally aligned with or slightly higher than the receiving end portion 226 of an inclined or other conveyor structure 227. Means are provided for moving the filled and now completely covered package laterally from said elevators 206 to said conveyor receiving end portion 226. The means for so moving the completed package comprises a pusher structure embodying an arm 228 which extends from a squared shaft or bar 229 slidably mounted in suitable frame supported bearings 230 (Figs. 13, 16 and 18). The free end of the arm 228 is provided with a pair of depending fingers 228a or other suitable enlargement for engaging the rear side of the completed package.

The bar 229 with its pusher 228 is reciprocated horizontally by means of a box cam 231 carried by the cam shaft 215 which acts on a roller carried by a rod 232 which is horizontally slidably mounted in suitable supporting brackets 233 carried by the frame structure of the machine. One end of said arm may be forked as shown in Fig. 14 to embrace the cam shaft 215 at one side of the cam 231 to thereby additionally slidably support and guide the rod in its movement. The other end of the rod is connected by suitable pin slotted means to an arm 234 which is secured to and extends from the lower end portion of a rotatably supported vertically extending shaft 235. The upper end portion of said shaft 235 has secured to it another arm 236 which has its free end connected by means of a link 237 to a suitable portion of said slidably mounted bar 229. It will be seen that rocking motion imparted to the shaft 235 by the cam 231 will be transmitted into horizontal reciprocating movement of the bar 229 and pusher 228. Forward movement of the pusher 228 serves to cause its depending fingers 228a to engage the completed elevated package resting on the elevators 206 and to move the same laterally to said receiving portion 226 of the conveyor structure 227.

The conveyor 176 may be driven continuously by any suitable driving means. While the filled packages are held against movement in the cover applying mechanism, the belt may slip under said packages to prevent the line of packages from advancing while the package elevators 206 are moved upwardly, said elevators have secured to them vertically elongated stop bars 238 which engage the leading side of the second package in the line while the first package is being elevated.

The described apparatus produces a package embodying a container construction of adequate strength for the packaging of food stuffs, for example cheese which may be introduced in hot fluid condition, and it results in the production of a package which is of neat and attractive appearance. The package when completed embodies no fold lines or other creases through the area of any wall, the only creases being those which form the corners of the package. In the application of glue to the bottom forming receptacle, it is practicable to apply a sufficient amount of glue or to so locate the area of glue application that some of the glue will cause the bottom forming receptacle to be adhesively attached to the tubular body member, this being desirable for some purposes. Similarly, it is very easy to so control the amount of glue applied and to restrict and locate the area of glue application that there will be no danger whatever of any gluing of either the bottom forming or cover receptacles to the tubular body member, this being particularly desirable in many cases especially in respect of the cover member.

Changes may be made in the described structure without departing from the principles of the invention.

I claim:

1. In apparatus of the class described, a vertically reciprocable mandrel and means for effecting reciprocation thereof, a box forming die aligned with said mandrel for movement of the latter through said die, means for folding a blank around an upper portion of said mandrel while the mandrel is in lowered position with its lower end portion passed through said die, and means for shifting the blank folded around said upper mandrel portion to the lower portion thereof upon movement of said mandrel to elevated position.

2. In apparatus of the class described, a reciprocable mandrel and means for effecting reciprocation thereof, means for folding a blank around one portion of said mandrel when the mandrel is at one end of its stroke, and means for shifting the blank folded around said mandrel to another portion thereof upon movement of the mandrel to the other end of its stroke.

3. In apparatus of the class described, a reciprocable mandrel and means for effecting reciprocation thereof, means for folding a blank around one portion of said mandrel when the mandrel is at one end of its stroke, and means for shifting the blank folded around said mandrel to another portion thereof upon movement of the mandrel to the other end of its stroke, said blank folding means comprising folding plates arranged to fold portions of said blank against opposite sides of said mandrel, said folding plates being fixedly mounted in respect of movement in the direction of mandrel movement and being provided with means engaging an edge of the folded blank to effect said shifting thereof on said mandrel as an incident to movement of the mandrel to said other end of its stroke.

4. In apparatus of the class described, a reciprocable mandrel and means for effecting reciprocation thereof, means for folding a blank around one portion of said mandrel when the mandrel is at one end of its stroke, means for shifting the blank folded around said mandrel to another portion thereof upon movement of the mandrel to the other end of its stroke, and means carried by said mandrel for effecting unitary movement of said mandrel and the shifted folded blank thereon when the mandrel returns to the first mentioned end of its stroke.

5. In apparatus of the class described, a reciprocable mandrel and means for effecting reciprocation thereof, means for folding a blank around one portion of said mandrel when the mandrel is at one end of its stroke, means for shifting the blank folded around said mandrel to another portion thereof upon movement of the mandrel to the other end of its stroke, and a pawl mounted in said mandrel so as to be movable inwardly and outwardly thereof for engaging, when the pawl is in an outwardly disposed position, an edge portion of the shifted folded blank on the mandrel when the latter returns to the first mentioned end of its stroke, thereby to effect unitary movement of said mandrel and shifted folded blank, said pawl being movable inwardly of the mandrel so as to be slidable through a folded blank on the first mentioned portion of the mandrel when the mandrel moves to said other end of its stroke.

6. In apparatus of the class described, a reciprocable mandrel and means for effecting reciprocation thereof, means for folding a blank around one portion of said mandrel when the mandrel is at one end of its stroke, means for shifting the blank folded around said mandrel to another portion thereof upon movement of the mandrel to the other end of its stroke, a pawl mounted in said mandrel so as to be movable inwardly and outwardly thereof for engaging, when the pawl is in an outwardly disposed position, an edge portion of the shifted folded blank on the mandrel when the latter returns to the first mentioned end of its stroke, thereby to effect unitary movement of said mandrel and shifted folded blank, said pawl being movable inwardly of the mandrel so as to be slidable through a folded blank on the first mentioned portion of the mandrel when the mandrel moves to said other end of its stroke, a die aligned with said mandrel for movement of a portion of the mandrel through said die when the mandrel moves to said first mentioned end of its stroke, means for positioning a box blank between said mandrel and die when the mandrel is located at the other end of its stroke, said die being operative to fold said blank around the shifted folded blank on said mandrel when the mandrel is moved into and through said die to said first mentioned end of its stroke.

7. In apparatus of the class described, box forming means comprising a die and a plunger reciprocable into and out of said die for forcing a box blank into and through said die so as to form said blank into an open-topped box, means for receiving the box so formed upon its discharge from said die, said means being mounted for pivotal movement for transporting said open-topped box and inverting the same to constitute the same a downwardly facing flanged box cover, an upwardly tapering funnel structure positioned to receive said box cover in outwardly telescoped position on the smaller end of said funnel structure, and means for moving a package element upwardly through said funnel structure and into said cover.

8. In apparatus of the class described, box forming means comprising a die and a plunger reciprocable into and out of said die for forcing a box blank into and through said die so as to form said blank into an open-topped box, means for receiving the box so formed upon its discharge from said die, said means being mounted for pivotal movement for transporting said open-topped box and inverting the same to constitute the same a downwardly facing flanged box cover, an upwardly tapering funnel structure positioned to receive said box cover in outwardly telescoped position on the smaller end of said funnel structure, and means for moving a package element upwardly through said funnel structure and into said cover, said last mentioned means comprising an elevator for propelling the package element through said funnel structure, and a movable holder engaging said cover to control movement thereof off said funnel structure incident to the movement of said package element into the cover.

9. In apparatus of the class described, box forming means comprising a die and a plunger reciprocable into and out of said die for forcing a box blank into and through said die to form said blank into an open-topped box, means for receiving the box so formed upon its discharge from said die, said means being mounted for pivotal movement for transporting said open-topped box and inverting the same to constitute the same a downwardly facing flanged box cover, an upwardly tapering funnel structure positioned to receive said box cover in outwardly telescoped position on the smaller end of said funnel structure, means for moving a package element upwardly through said funnel structure and into said cover, comprising a vertically reciprocable elevator for propelling the package element through said funnel structure, and a movable holder engaging said cover to control movement thereof off said funnel structure incident to the movement of said package element into the cover, and means for feeding the covered package thus formed from said elevator when the latter is in an elevated position.

JOHN RIEMER.

REFERENCES CITED

The following references are of record in the file of this patent:

FOREIGN PATENTS

| Number | Country | Date |
|---|---|---|
| 293,167 | Great Britain | July 5, 1928 |
| 297,046 | Great Britain | Sept. 10, 1928 |
| 458,232 | Great Britain | Dec. 15, 1936 |
| 481,008 | Great Britain | Mar. 3, 1938 |